(12) United States Patent
Kempf et al.

(10) Patent No.: US 11,340,693 B2
(45) Date of Patent: May 24, 2022

(54) AUGMENTED REALITY INTERACTIVE MESSAGES AND INSTRUCTIONS FOR BATCH MANUFACTURING AND PROCEDURAL OPERATIONS

(71) Applicant: Honeywell International Inc., Morris Plains, NJ (US)

(72) Inventors: Alicia C. Kempf, Abington, PA (US); Rahul Chandra Nath, Redfern (AU)

(73) Assignee: Honeywell International Inc., Charlotte, NC (US)

( * ) Notice: Subject to any disclaimer, the term of this patent is extended or adjusted under 35 U.S.C. 154(b) by 8 days.

(21) Appl. No.: 16/795,288

(22) Filed: Feb. 19, 2020

(65) Prior Publication Data
US 2021/0255693 A1 Aug. 19, 2021

(51) Int. Cl.
| | | |
|---|---|---|
| G06F 3/01 | (2006.01) | |
| G06T 7/73 | (2017.01) | |
| G06T 19/00 | (2011.01) | |
| G06V 20/20 | (2022.01) | |
| G06F 3/0482 | (2013.01) | |

(52) U.S. Cl.
CPC ............ *G06F 3/011* (2013.01); *G06F 3/017* (2013.01); *G06T 7/74* (2017.01); *G06T 19/006* (2013.01); *G06V 20/20* (2022.01); *G06V 2201/06* (2022.01)

(58) Field of Classification Search
CPC . G06F 3/011; G06F 3/017; G06T 7/74; G06T 19/006; G06K 9/00671; G06K 2209/19
See application file for complete search history.

(56) References Cited

U.S. PATENT DOCUMENTS

| | | | |
|---|---|---|---|
| 4,593,380 A | * | 6/1986 | Kocher ................ G05B 19/058 700/12 |
| 9,659,410 B2 | | 5/2017 | Hancock et al. |

(Continued)

OTHER PUBLICATIONS

"Augmented Reality", Wikipedia, Retrieved from "https://en.wikipedia.org/w/index.php?title=Augmented_reality&oldid=939099121", page was last edited on Feb. 4, 2020, at 09:49 (UTC).

(Continued)

*Primary Examiner* — Sing-Wai Wu
(74) *Attorney, Agent, or Firm* — Ortiz & Lopez, PLLC; Luis M. Ortiz; Kermit D. Lopez (57) ABSTRACT

Methods and systems for the delivery of interactive messaging and instructions through an augmented reality device in a batch production or a sequential operation, can involve displaying a menu through a user interface associated with an augmented reality device configured with a scope of responsibility awareness that allows the augmented reality device to display a visualization of batch production data associated with a batch production or sequential operation data associated with a sequential operation that is within an assigned scope of responsibility of a user, and graphically expanding the menu in response to an input by the user. The expanded menu can include graphically displayed buttons that allow the user to select and view the batch production data or the sequential operation data. The visualization of the batch production data or the sequential operation data can be displayed without the need for an operator station.

20 Claims, 7 Drawing Sheets

(56) References Cited

U.S. PATENT DOCUMENTS

| | | |
|---|---|---|
| 10,445,933 B2 | 10/2019 | Rasane et al. |
| 2009/0088875 A1* | 4/2009 | Baier ............... G05B 19/41865 |
| | | 700/83 |
| 2015/0325047 A1 | 11/2015 | Conner et al. |
| 2016/0110919 A1 | 4/2016 | Hancock et al. |
| 2017/0131851 A1* | 5/2017 | Thompson ......... H04N 21/2665 |
| 2018/0365495 A1 | 12/2018 | Laycock et al. |
| 2020/0004016 A1 | 1/2020 | Gross et al. |
| 2020/0035203 A1 | 1/2020 | Kosik et al. |

OTHER PUBLICATIONS

"Wayfinding", Wikipedia Retrieved from "https://en.wikipedia.org/w/index.php?title=Wayfinding&oldid=932329879", Page was last edited on Dec. 25, 2019, at 02:31 (UTC).

* cited by examiner

AUGMENTED REALITY INTERACTIVE MESSAGES AND INSTRUCTIONS FOR BATCH MANUFACTURING AND PROCEDURAL OPERATIONS

TECHNICAL FIELD

Embodiments relate to AR (Augmented Reality) devices, methods, and systems. Embodiments further relate to the presentation of information related to batch production or sequential operations in a production or manufacturing facility. Embodiments also relate to the delivery of interactive messaging and instructions through an augmented reality device in a batch production or a sequential operation.

BACKGROUND

In batch manufacturing and in procedural operations used within continuous manufacturing, batches, recipes and sequences can generate messages or interactive instructions to an operator. These messages can instruct the operator to perform some task or a carry out a series of actions and interact with the instructions by confirming the instruction or message or additionally entering some data such as a target or entry parameters.

The instructions or actions that may be needed carry out corrective actions often need to be performed in the field without access to an operator station, which would have shown an operator the relevant data he or she may require in order to successfully perform the task. Not carrying out instructions properly can result in cycle time delays, batch quality issues, and unsafe working conditions and material waste, to name a few problems. For example, moving a feed line and improperly connecting equipment in an industrial facility can result in a leakage of hazardous materials, which may require costly cleanup activities.

Additionally, when an operator leaves a control room or an operator station to go into the field, or take a break or perform some other activity, the operator must still remain aware of any pending messages/instructions, which may require to be confirmed in the near future or in the present. Delaying confirmation of messages may result in halting progress on a batch, which in turn can delay the batch cycle time and in some cases if a message is not confirmed in a certain amount of time, can also impact the quality of the batch and result in wasted material and prevent a market release of a batch.

In the pharmaceutical industry, for example, in the absence of a central control room, operator stations may be placed throughout a production facility to provide this data to operators. Operators in clean rooms also may need to wear gowns and gloves for use in sterile environments, which can make it cumbersome to interact with traditional computing peripherals such as pointing devices and keyboards.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments to provide for improved AR devices, methods, and systems.

It is another aspect of the disclosed embodiments to provide for methods and systems for the AR presentation of information related to a batch production or a sequential operation in a manufacturing or production facility.

The aforementioned aspects and other objectives can now be achieved as described herein. In an embodiment, a method for the delivery of interactive messaging and instructions through an augmented reality device in a batch production or a sequential operation, can involve displaying a menu through a user interface associated with an augmented reality device configured with a scope of responsibility awareness that allows the augmented reality device to display a visualization of batch production data associated with a batch production or sequential operation data associated with a sequential operation that is within an assigned scope of responsibility of a user; and graphically expanding the menu in response to an input by the user, wherein the expanded menu comprises graphically displayed buttons that allow the user to select and view the batch production data or the sequential operation data and wherein the visualization of the batch production data or the sequential operation data is displayed without the need for an operator station.

In an embodiment of the method, the batch production data or the sequential operation data can comprise at least one of: batch data, procedural messages, and instructions.

In an embodiment of the method, the instructions can comprise interactive instructions generated by at least one of: a recipe, a sequence or a recipe step of a process.

In an embodiment of the method, the instructions can be propagated with the procedural messages.

In an embodiment of the method, the procedural messages can contain textual data presented to the user through the visualization of the batch production data or the sequential operation data and the procedural messages can be generated with respect to at least one tagged point that automatically provides the scope of responsibility awareness to determine if the textual data should be shown to the user of the augmented reality device.

In an embodiment of the method, the visualization can comprise a visual overlay that augments a view of industrial equipment.

In an embodiment of the method, the visual overlay can display the context of operations for executing production including system automated tasks and manual interactions.

In an embodiment, a system for the delivery of interactive messaging and instructions through an augmented reality device in a batch production or a sequential operation, can include: an augmented reality device associated with a user interface, wherein a menu is displayed through the user interface associated with the augmented reality device, wherein the augmented reality device is operable with a scope of responsibility awareness that allows the augmented reality device to display a visualization of batch production data associated with a batch production or sequential operation data associated with a sequential operation that is within an assigned scope of responsibility of a user; and graphically displayed buttons associated with the user interface that allow the user to select and view the batch production data or the sequential operation data, wherein the menu is graphically expandable in response to an input by the user, and wherein the visualization of the batch production data or the sequential operation data is displayed without the need for an operator station.

In an embodiment of the system, the batch production data or the sequential operation data can comprise at least one of: batch data, procedural messages, and instructions.

In an embodiment of the system, the instructions can comprise interactive instructions generated by at least one of: a recipe, a sequence or a recipe step of a process.

In an embodiment of the system, the instructions can be propagated with the procedural messages.

In an embodiment of the system, the procedural messages can contain textual data presented to the user through the visualization of the batch production data or the sequential operation data, and the procedural messages can be generated with respect to at least one tagged point that automatically provides the scope of responsibility awareness to determine if the textual data should be shown to the user of the augmented reality device.

In an embodiment of the system, the visualization can comprise a visual overlay that augments a view of industrial equipment.

In an embodiment of the system, the visual overlay can display the context of operations for executing production including system automated tasks and manual interactions.

In another embodiment, a system for the delivery of interactive messaging and instructions through an augmented reality device in a batch production or a sequential operation can include: at least one processor, and a non-transitory computer-usable medium embodying computer program code. The computer-usable medium is capable of communicating with the at least one processor, and computer program code can include instructions executable by the at least one processor and configured for: displaying a menu through a user interface associated with an augmented reality device configured with a scope of responsibility awareness that allows the augmented reality device to display a visualization of batch production data associated with a batch production or sequential operation data associated with a sequential operation that is within an assigned scope of responsibility of a user; and graphically expanding the menu in response to an input by the user, wherein the expanded menu comprises graphically displayed buttons that allow the user to select and view the batch production data or the sequential operation data and wherein the visualization of the batch production data or the sequential operation data is displayed without the need for an operator station.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The disclosed embodiments relate to AR (Augmented Reality) devices, systems and methods, which may be employed in an industrial facility to alert an operator to view current pending messages/instructions and future messages/instructions, while also allowing the operator to easily view the relevant data that may be necessary to carry out tasks and confirm the messages/instructions in any location in the industrial facility or elsewhere. Note that as utilized herein, the term AR or augmented reality can relate to an interactive experience of a real-world environment where the objects that reside in the real world are enhanced by computer-generated perceptual information, sometimes across multiple sensory modalities, including visual, auditory, haptic, somatosensory and olfactory.

AR is thus an interactive experience of a real-world environment whose elements are "augmented" by computer-generated perceptual information, including visual and auditory information. The augmented information can be constructive (i.e., additive to the natural environment) or destructive (i.e., masking of the natural environment) and can be seamlessly interwoven with the physical world such that it can be perceived as an immersive aspect of the real environment.

Augmented reality (AR) can provide a presentation or view of a physical, real-world environment with elements augmented by a computer-generated sensory input. Computer-generated sensory inputs may include sound, video, graphics, or global positioning system (GPS) data. Generally, augmentation can be implemented in real-time and in semantic context with environmental elements. An AR display provided by an AR device can align virtual information with the physical world. In some examples, virtual information may be layered over the physical-world view on a computing device. The virtual information layer can be referred to as an AR overlay or a content overlay. The content may comprise, for example, text elements, images, 3-dimensional models, or any other kind of information adapted for graphical representation in the display of the AR device.

The disclosed embodiments can be implemented to improve batch cycle time with timely responses to messages, while facilitating the prevention of batch quality issues from improperly performed procedures and reducing training needs or additional personnel to assist inexperienced operators with the performance of infrequently performed tasks.

By displaying other relevant batch data for a unit or a piece of equipment, an operator can effectively monitor the currently running batches and easily see the status of the equipment, which batches are currently running in each piece of equipment and also visualize key parameters, which may indicate if the equipment is performing optimally and if there are any quality issues with the batch.

The disclosed AR device and related methods and systems can be configured with a Scope of Responsibility (SOR) awareness, meaning that only information is revealed to an operator, which may be related to operator data and messages concerning the batches and procedures that are running on units in his or her scope of responsibility. In the pharmaceutical Industry, for example, a large number of operator stations may be required in a pharmaceutical production facility, and these stations may require a special environmental housing to be installed and maintained in clean rooms, which can take up a significant physical footprint as compared to a single AR device per operator that can be worn by a user and moved easily to any location within the pharmaceutical production facility or elsewhere. Replacement of multiple operator stations with fewer AR devices can thus provide significant cost savings.

As will be discussed in greater detail, the disclosed AR device can be associated with an operator wearing the AR device and may require a logon. Once logged in, the AR device is provided with an SOR awareness, which allows the AR device to display any notification, which may be within the operator's assigned SOR. Interactive instructions, which can be generated from any recipe, sequence or recipe step, can be propagated throughout the system as a message, which is a type of notification. The message can contain contextual data presented to the operator, for example, a batch ID, a unit, a source tagname of a sequence or a recipe step, which may generate the message, message or instruction text. Optionally, a target and an entry parameter can also be shown and entered into the message and returned to the system once confirmed.

Messages can be acknowledged and confirmed by the operator and can also be configured to require electronic signatures. Since a tagged point can generate the message in a system, this message can be configured to automatically provide the SOR to determine if such information should be shown to the operator wearing the AR device. Entering the target quantity or confirming the message can be accomplished through a voice command. Similarly, an AR overlay can display any kind of system notification such as an alarm or an alert.

A visual overlay (e.g., an AR overlay) that augments a user's view of industrial equipment can provide the necessary context of operations to execute production including both system automated tasks and manual interactions. The AR device can provide a visualization of key parameters overlaid onto physical areas of equipment, such as, for example, tank levels, temperature data, pH levels, flow rater, and pressure. In addition, the AR device can provide for the visualization of production and recipe information overlaid on areas of the equipment (e.g., Unit name, unit/equipment status, Batch ID currently in production, timing and production scheduling information, maintenance schedules and tasks, batch messages, operator tasks and confirmations).

The AR device can also provide visualization and AR interactions that allow for alerts for alarms, messages, delays to production, wayfinding to equipment or parts of equipment, highlighting of correct physical controls needed to perform tasks, access to manuals and or instruction in text, picture or video form to assist (e.g., to assure competence) in performing tasks. The AR device can also provide for a visualization of past and future messages. In addition to current messages, the AR device can show past and future messages, thereby allowing the operator to understand what happened in the past that may have led to the current conditions, and which tasks may be required in the future to allow the operators to be prepared in advance to respond quickly.

Figure 1:
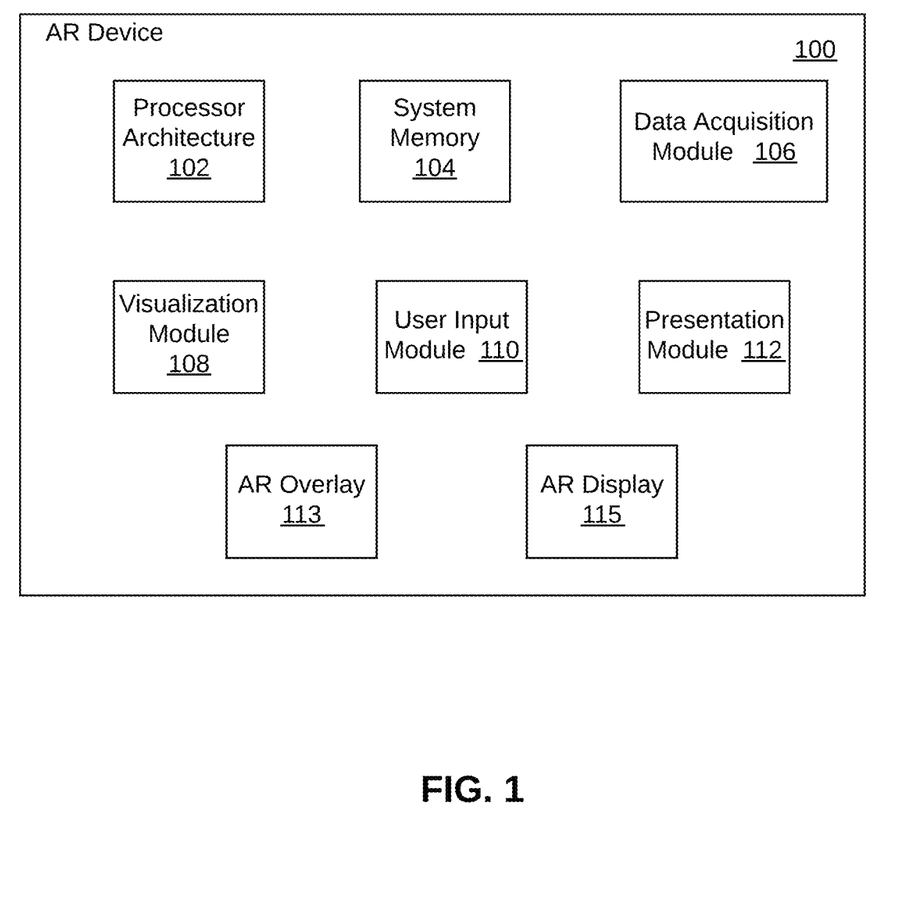
FIG. 1 illustrates a schematic block diagram representation of an AR device, in accordance with an embodiment.

FIG. 1 illustrates a schematic block diagram representation of an AR device 100, in accordance with an embodiment. The AR device 100 may be implemented using any desired platform, but can generally be implemented using a portable computing device. For example, the AR device 100 can be realized as any of the following, without limitation: a laptop computer, a tablet computer, a smartphone, a wearable computing device, AR glasses or goggles, a specialized piece of diagnostic equipment, and an embedded processor-based device or system, or any other device that includes a processor architecture 102.

In some embodiments, the AR device 100 may be implemented as so-called "smartglasses". That is, the AR device 100 can be implemented as a device resembling eyeglasses. Such smartglasses can include eyewear that employ cameras to intercept the real-world view and augment it with a virtual graphical or aural interface projected from their eyepieces directly onto the user's eye or onto a layer of a transparent lens (or to the user's ear in the case of audio-only smartglasses).

Examples of AR smartglasses which may be utilized as the AR device 100 can include, for example, Google Glass, Vuzix Blade AR, Vuzix M-100, Vuzix Wrap 310 L, Sony SmartEye Glass, Lockdown Focus, Everysight Raptor, Epson, Occulus, Lumis, Letin AR, Cast AR, Moverio BT-200, Meta, Laster See Thru, Icis, ORA-S, Glass UP, K-Glass, Solos, ODG AR/R8 and R9, Microsoft HoloLens, Optinvent Ora-2MG 5 Smart Glass AR, and GarminVaria Vision.

In other embodiments, the AR device 100 may be implemented in the context of a hand held computing device such as a smartphone or tablet computer, which can implement an AR UI. An example of an AR device that includes an AR UI, which can be adapted for use with one or more embodiments and/or as the AR device 100, is disclosed in U.S. Patent Application No. 20180365495 entitled, "Augmented Reality User Interface on Mobile Device for Presentation of Information Related to Industrial Process, Control and Automaton System, or Other System," which published on Dec. 20, 2018 to Graeme Laycock, et al., and which is assigned to Honeywell International Inc. U.S. Patent Application No. 20180365495 is incorporated herein by reference in its entirety.

Note that various electronic (e.g., computing) devices can include AR capabilities and/or display AR content, such as smartphones, smart glasses, a heads-up displays, a digital helmet, etc. Some AR devices can be implemented as self-contained computing devices that can wirelessly access content stored, for example, on the Internet. Other AR devices, such as an AR headset or AR contact lenses may require power, additional computational capabilities, and/or system (e.g., Internet) access that is supplied by various adapters (e.g., a power adapter) and/or computing devices, such as a smartphone, a game console, a laptop computer, a desktop computer, etc.

The AR device 100 may include, without limitation: the processor architecture 102, a system memory 104, a data acquisition module 106, an AR visualization module 108, a user input module 110, and a presentation module 112. In practice, an embodiment of the AR device 100 may include additional or alternative elements and components, as desired for a particular application. These elements and features of the AR device 100 may be operatively associated with one another, coupled to one another, or otherwise configured to cooperate with one another as needed to support the desired functionality—in particular, the delivery of interactive messaging and instructions through an AR device in a batch production or a sequential operation, as described herein. For ease of illustration and clarity, the various physical, electrical, and logical couplings and interconnections for these elements and features are not depicted in FIG. 1. Moreover, it should be appreciated that embodiments of the AR device 100 can include other elements, modules, and features that cooperate to support the desired functionality. For simplicity, FIG. 1 only depicts certain elements that relate to AR device features, described in more detail below.

Note that the AR device 100 can further include an AR overlay 113 and an AR display 115. The visualization module 108 and/or the presentation module 112 may individually or jointly provide or facilitate implementation of the AR overlay 113 via an AR overlay program that includes AR overlay steps or instructions. The AR display 115 may be, for example, a display screen of the AR device 100.

The processor architecture 102 may be implemented using any suitable processing system, such as one or more processors (e.g., multiple chips or multiple cores on a single chip), controllers, microprocessors, microcontrollers, processing cores and/or other computing resources spread across any number of distributed or integrated systems, including any number of "cloud-based" or other virtual systems. The AR device 100 may be implemented as a hardware device with embedded software that can be connected securely to the cloud via wired or wireless connection The processor architecture 102 can communicate electronically with system memory 104. The system memory 104 represents any non-transitory short or long term storage or other computer-readable media capable of storing programming instructions for execution on the processor architecture 102, including any sort of random access memory (RAM), read only memory (ROM), flash memory, magnetic or optical mass storage, and/or the like. It should be noted that the system memory 104 represents one suitable implementation of such computer-readable media, and alternatively or additionally, the processor architecture 102 could receive and cooperate with external computer-readable media that is realized as a portable or mobile component or application platform, e.g., a portable hard drive, a USB flash drive, an optical disc, or the like.

The data acquisition module 106 can be suitably configured to obtain data for a target apparatus in, for example, a manufacturing facility or a production facility. In certain embodiments, the data acquisition module 106 can initiate a download of data upon synchronization of a communication connection between the AR device 100 and a "base station" or server, including a database or another form of stored maintenance data for one or more potential targets (e.g., equipment in an industrial facility).

The visualization module 108 can be configured to provide for an AR visualization based on a scanning of a visual field of a user and a detection and recognition of features of the visual field. A visual field can be an image captured using a visual input device, such as a camera. Hardware capabilities of the visual input device control the boundaries of the visual field. Generally, the visual input device can be worn by a user, which can capture an image from the direction the visual input device is pointed. Recognized features may include tags, wearable position indicators, and/or other designated, system-recognizable objects that can, for example, indicate macrolocation data and microlocation data. The visualization module 108 can provide for a visualization of batch production data associated with a batch production or sequential operation data associated with a sequential operation that is within an assigned scope of responsibility of a user.

The user input module 110 can be configured to receive input requests and information from a user of the AR device 100. User input may include a request to provide an instruction, a request to provide clarifying data associated with an instruction, a request for the presentation of reference material, and/or an instruction to designate a task as complete. User input may also include a command to capture an image for documentation purposes; to request another task assignment, such as a subsequent task or to return to a previous task; or to receive maintenance data acquired during performance of the current task, such as a reading, measurement, and/or another form of status data. A user input may include, for example, a reading or a measurement, which may be used by the AR device 100, for example, to keep a record of tasks performed and/or to provide a user with adaptive instructions that may change based on user input. In certain embodiments, the user input module 110 may receive and process user input compatible with voice recognition technology. In some embodiments, the user input module 110 can receive and process user input in the form of a button-push, toggle-switch, touchscreen selection, or the like, and or through input received through various AR UI (User Interface) elements such as various graphically displayed and interactive menus.

The presentation module 112 can be configured to provide data, obtained by the data acquisition module 106, to the user in a visual and/or auditory format and based on a scope of responsibility awareness, as discussed herein. To present maintenance data in a visual format, the presentation module 112 can utilize a display device, such as a pair of AR glasses or a mobile computing device. Visual data can be presented in a visual field using, for example, a translucent overlay of graphical elements, including without limitation: icons, text, menus, messages, schematics or diagrams associated with a target apparatus or surrounding structures, location information, maps and other indications of travel directions and position movement within a visual field, animation or still imagery depicting repair instructions, and indications of emphasis (e.g., highlighting, pointing arrows, and/or flashing).

Using a pair of AR glasses, for example, a user can view a visual field, along with a translucent overlay produced by the AR device 100. The translucent overlay can present graphical elements such as shown and described herein with respect to FIG. 2 to FIG. 15. Alternatively or in combination with such a display device, the presentation module 112 can be further configured to provide data to a user via an audio device such as an earpiece, earbuds, headphones, or other form of speaker. In certain embodiments, the presentation module 112 may present auditory instructions and audible alerts.

In practice, the data acquisition module 106, the visualization module 108, the user input module 110, and the presentation module 112 may be implemented with (or cooperate with) the processor architecture 102 to perform at least some of the functions and operations described in more detail herein. In this regard, the data acquisition module 106, the visualization module 108, the user input module 110, and the presentation module 112 may be realized as suitably written processing logic, application program code, or the like.

Figure 2:
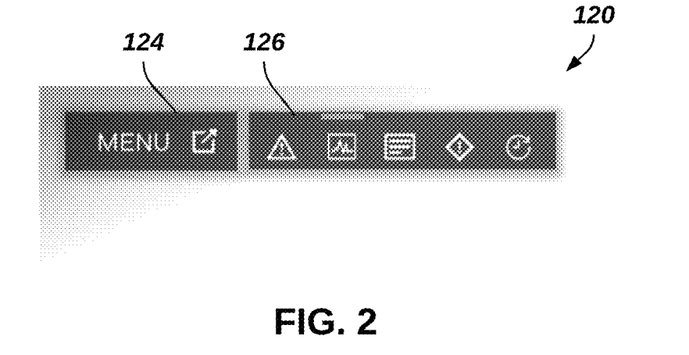
FIG. 2 illustrates a top menu that is graphically displayable in an AR UI, in accordance with an embodiment.

FIG. 2 to FIG. 6 illustrate examples of AR elements that can be implemented in accordance with one or more embodiments. FIG. 2 illustrates a top menu 120 including a menu section 124 and a menu section 126 can be graphically displayed in an AR UI, in accordance with an embodiment. The top menu 120 is an AR element that can display flashing colored indicators for different types of incidences, which may occur in a production facility or a manufacturing facility. The menu can 120 can function as a main menu that can expand in response to a user input.

Figure 3:
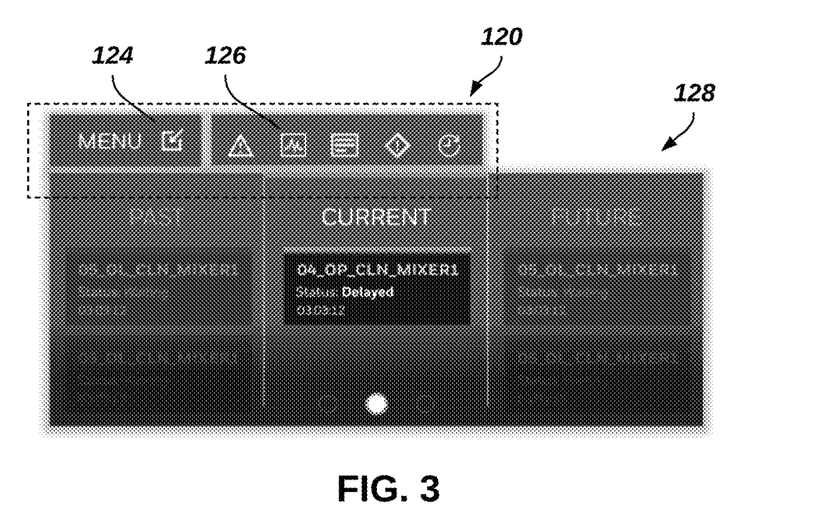
FIG. 3 illustrates an expanded menu that is graphically displayable in an AR UI, in accordance with an embodiment.

FIG. 3 illustrates an expanded menu 128 that can be graphically displayed in an AR UI through an AR display such as the AR display 115, in accordance with an embodiment. The expanded menu 128 is an AR element that can display past, current and future processes.

Figure 4:
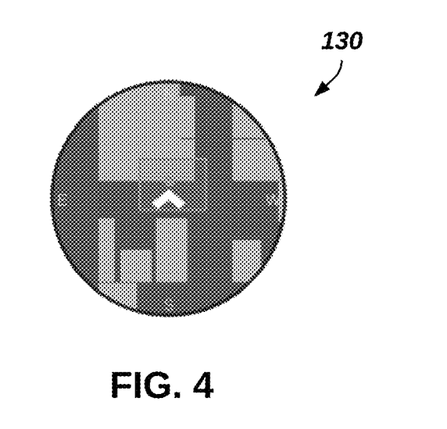
FIG. 4 illustrates a map that is graphically displayable in an AR UI, in accordance with an embodiment.

FIG. 4 illustrates a map 130 that can be graphically displayed in an AR UI through an AR display such as the AR display 115, in accordance with an embodiment. The map 130 is an AR element that can indicate the location of the user and the equipment with incidences.

Figure 5:
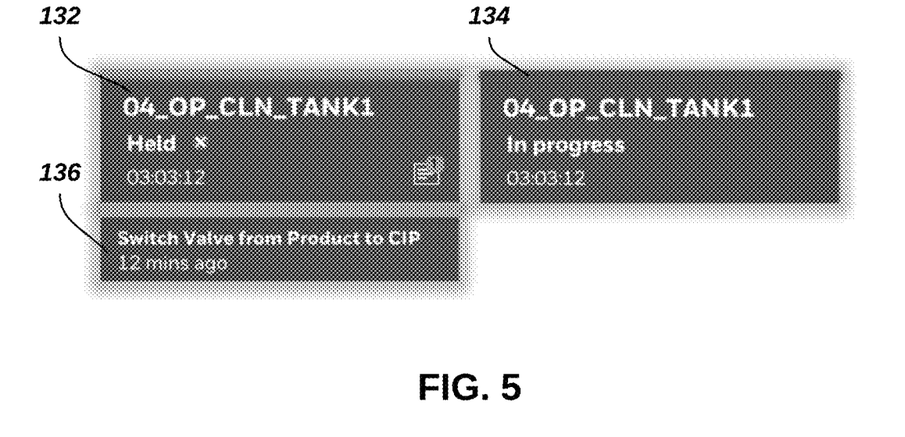
FIG. 5 illustrates status cards that are graphically displayable in an AR UI, in accordance with an embodiment.

FIG. 5 illustrates status cards 132, 134, and 136 that can be graphically displayed in an AR UI through an AR display such as the AR display 115, in accordance with an embodiment. The status cards 132, 134, and 136 are AR elements can display the status of each piece of equipment and their processes.

Figure 6:
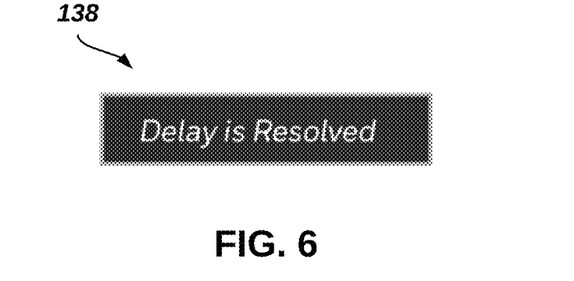
FIG. 6 illustrates a resolve message that is graphically displayable in an AR UI, in accordance with an embodiment.

FIG. 6 illustrates a resolve message 138 that can be graphically displayed in an AR UI through an AR display such as the AR display 115, in accordance with an embodiment. The resolve message 138 is a type of AR element that can indicate when an incident is recognized as resolved.

Figure 7:
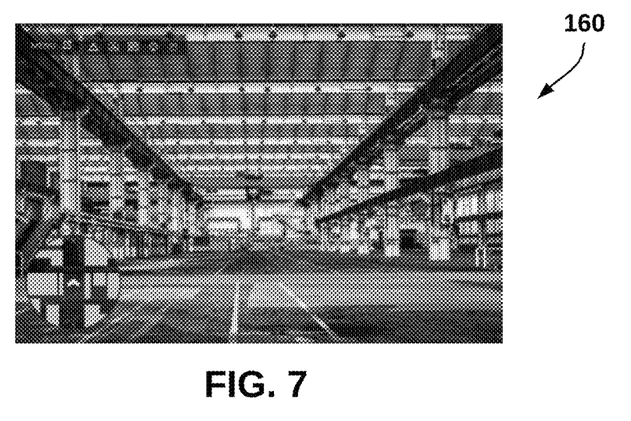
FIG. 7 illustrates an AR screen that can display an initial freestyle view for a user, in accordance with an embodiment.

FIG. 7 illustrates an AR screen 160 with an AR overlay that can display an initial freestyle view for a user, in accordance with an embodiment. It can be appreciated that the various example AR screens shown in FIG. 7 through FIG. 15 can be displayed through a display screen associated with an AR device such as the AR display 115 of the AR device 100 discussed earlier. A user may operate the AR device 100 in, for example, a freestyle mode that allows a user to look around to inspect different equipment and immediately obtain information about the status of such equipment. When an incident occurs, an appropriate symbol/color can flash in a top menu (e.g., the top menu 120) as shown in the in the AR screen 160 to draw attention.

Figure 8:
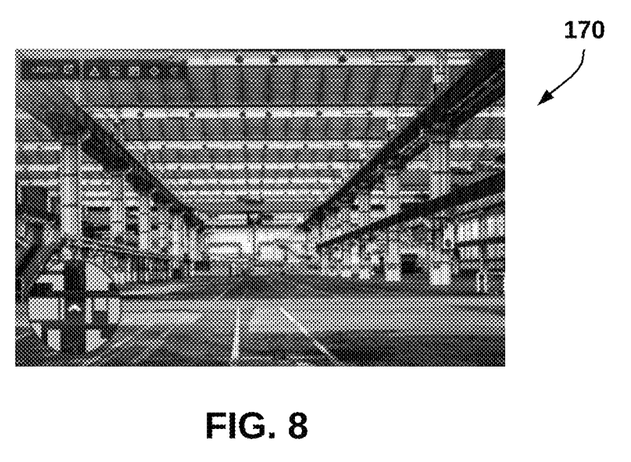
FIG. 8 illustrates an AR screen that can display a flashing alert, in accordance with an embodiment.

FIG. 8 illustrates an AR screen 180 with an AR overlay that can display a flashing alert, in accordance with an embodiment. As shown in the AR screen 180 in FIG. 8, the displayed map (e.g., 130) shown at the bottom left side of the AR screen 180 can provide a color indicator (e.g., a color such as orange) that the user can follow. That is, the user can follow the indicator on the map at the bottom left of their view, and can look around the space to locate an equipment piece visually in AR.

Figure 9:
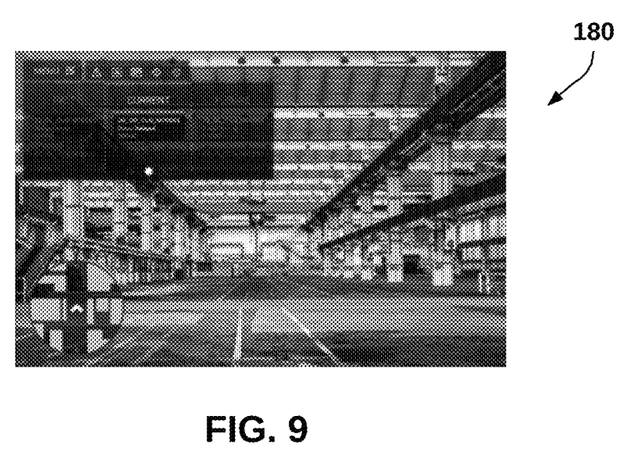
FIG. 9 illustrates an AR screen that can display an open full menu, in accordance with an embodiment.

FIG. 9 illustrates an AR screen 190 with an AR overlay that can display an open full menu such as the expanded menu 128, in accordance with an embodiment. That is, the user can tap the top menu shown in FIG. 8 to expand the main menu screen as shown in the AR screen 190 in FIG. 9. Here, the user can view past, current and future processes. The user can also click on an event, which may be an incident (e.g., delayed process) to focus/be directed to the incident.

Figure 10:
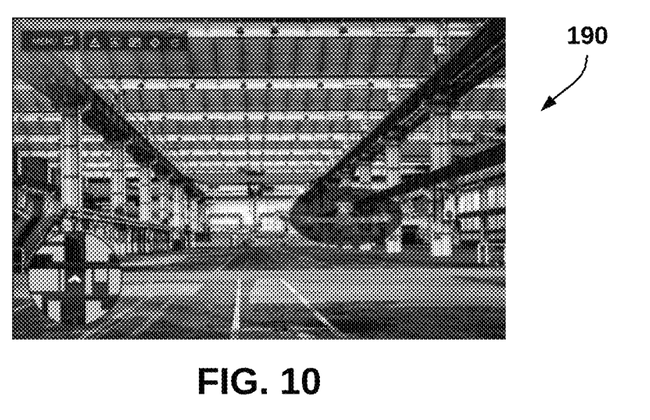
FIG. 10 illustrates an AR screen that can display an equipment indicator, in accordance with an embodiment.
Figure 11:
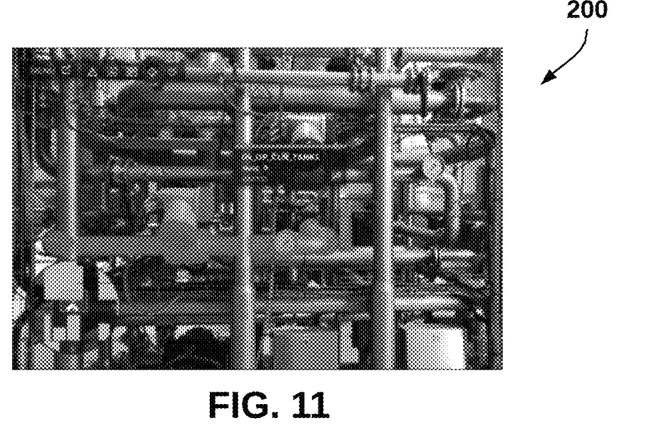
FIG. 11 illustrates an AR screen that can display an equipment status, in accordance with an embodiment.

FIG. 10 illustrates an AR screen 190 with an AR overlay that can display an equipment indicator, in accordance with an embodiment. FIG. 11 illustrates an AR screen 200 with an AR overlay that can display an equipment status, in accordance with an embodiment. That is, once situated at the piece of equipment, a user can view the status and messages related to the equipment in question. The user can then refer to physical troubleshooting or troubleshooting via supporting controls on their AR device, which may be, for example a smartphone, tablet computing device, or another type of AR device.

Figure 12:
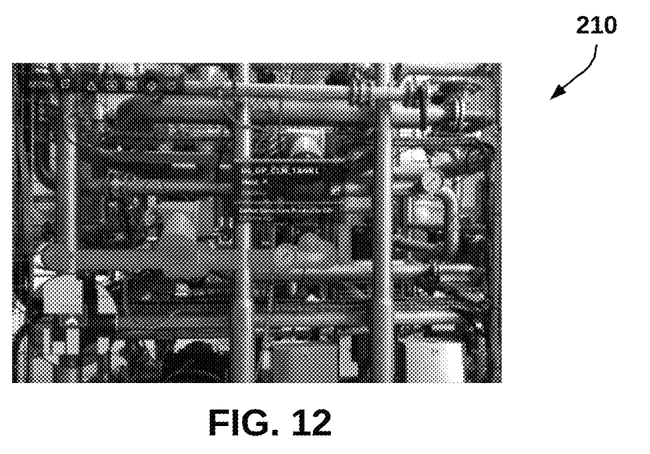
FIG. 12 illustrates an AR screen that can display an equipment status and a message, in accordance with an embodiment.

FIG. 12 illustrates an AR screen 210 with an AR overlay that can display an equipment status and a message, in accordance with an embodiment. The equipment status and message can be displayed as, for example, a status card such as the status cards 132, 134, and 136 discussed previously. In FIG. 12, example status cards are shown displayed centrally in the AR screen 210.

Figure 13:
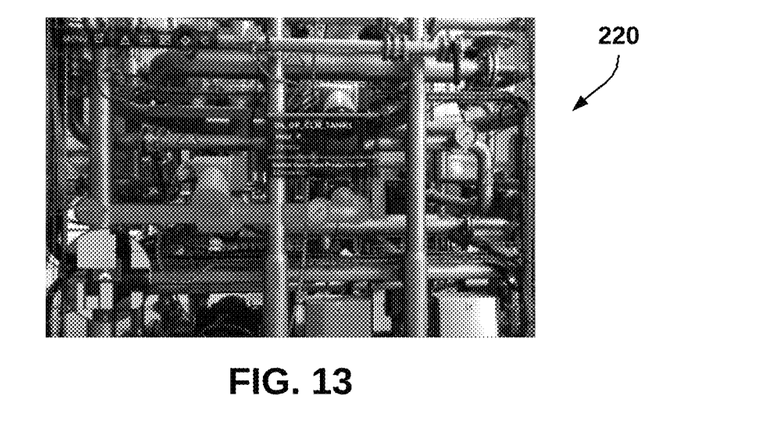
FIG. 13 illustrates an AR screen that can display an indication that the equipment status is completed, in accordance with an embodiment.

FIG. 13 illustrates an AR screen 220 with an AR overlay that can display an indication that the equipment status is completed, in accordance with an embodiment. The AR screen 220 can also display status cards such as the status cards 132, 134, and 136.

Figure 14:
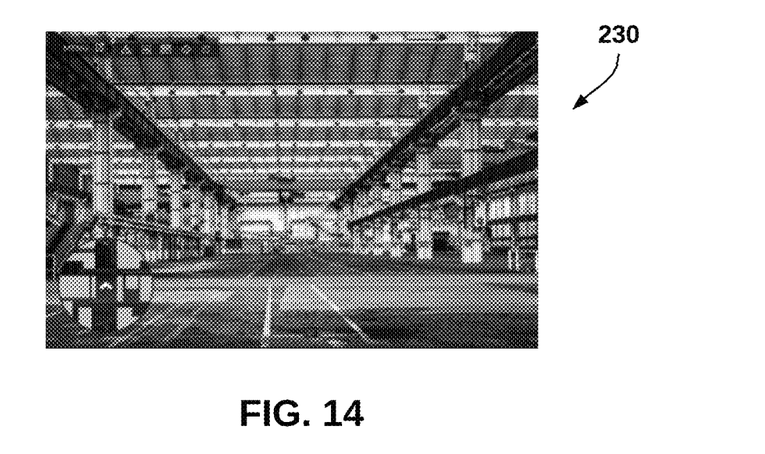
FIG. 14 illustrates an AR screen that can display a "back to normal" view, in accordance with an embodiment.

FIG. 14 illustrates an AR screen 230 with an AR overlay that can display a "back to normal" view, in accordance with an embodiment. That is, once a delay is recognized as resolved, a message will appear in the top right of the user's view and the flashing indicators will disappear. The user can be the presented with a freestyle mode until the next incident occurs, which may be indicated by new alerts.

Figure 15:
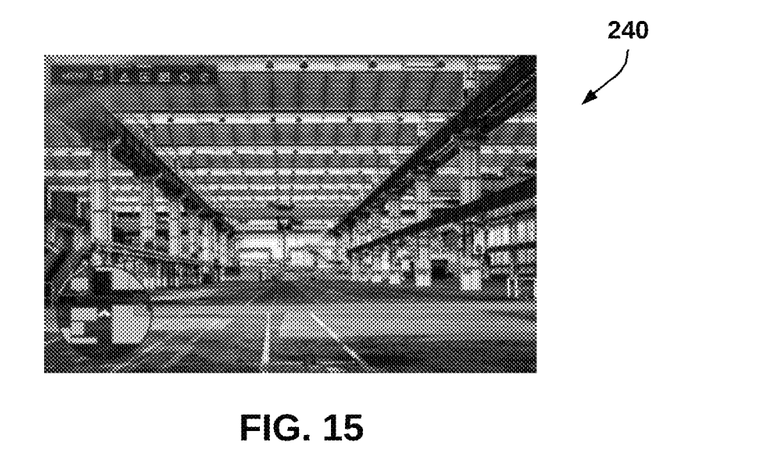
FIG. 15 illustrates an AR screen that can display new flashing alerts, in accordance with an embodiment.

FIG. 15 illustrates an AR screen 240 with an AR overlay that can display new flashing alerts, in accordance with an embodiment.

The AR device 100 can be associated with a user (e.g., an operator) wearing the AR device 100, which may require a logon. Once logged in, the AR device 100 can possess a Scope of Responsibility (SOR) awareness, which allows the AR device 100 to show any notification, which may be within the operator's assigned SOR. Interactive instructions, which may be generated from any Recipe, Sequence or Recipe Step, can be propagated throughout the system as a Message, which is a type of Notification. The Message can contain contextual data presented to the Operator (e.g., Batch ID, Unit, source tagname of Sequence or Recipe Step generating the message, message or instruction text).

Optionally, a target and entry parameter can also be shown and entered into the message and returned to the system once confirmed. Messages must be acknowledged and confirmed by the operator and can also be configured to require electronic signatures. Since a tagged point can generate the message in the system, this will automatically provide the scope of responsibility to determine if it should be shown to the operator wearing the device. Entering the target quantity or confirming the message can be accomplished through a voice command. Similarly, the AR overlay can show any kind of system notification such as an alarm or an alert.

The various AR screens and AR elements discussed above can thus provide a visual overlay that can augment a user's view of industrial equipment. This can provide the necessary context of operations to execute production including both system automated tasks and manual interactions including a visualization of key parameters overlaid onto physical areas of equipment (e.g., tank levels, temperatures, pH levels, flow rate, pressure, etc.). A visualization of production and recipe information overlaid on areas of equipment can also be implemented in the context of the AR overlay (i.e., a visual overlay such as an AR overlay).

The AR overlay can also display a unit name, unit/equipment status, Batch ID currently in production, timing and production scheduling information, maintenance schedules and tasks, batch messages, and operator tasks and confirmations. The visual overlay also provides for visualization and AR interactions that allow for alerts for alarms, messages, delays to production, and wayfinding to equipment or parts of equipment. Additional AR features can include highlighting of correct physical controls needed to perform tasks, access to manuals and or instruction in text, picture or video form to assist (e.g., to assure competence) in performing tasks, along with a visualization of past and future messages. In addition to current messages, the AR device 100 can show past and future messages allowing the operator to understand what happened in the past that lead to the current conditions, and what tasks will be required in the future allowing them to be prepared to respond quickly.

The disclosed embodiments can easily integrate and leverage existing messaging and interactive instructions and their automatic linkage and filtering for scope of responsibility for an operator, thereby allowing a operator to efficiently filter relevant messages for the batches and procedures running on equipment that operator may be responsible for.

Another feature that the disclosed embodiments can provided is lower cost of ownership. That is, multiple operator stations can be replaced with fewer AR devices, which take up a smaller footprint. Also for industries with centralized control rooms, it may be difficult to scale up production due to physical constraints of the control rooms. Rather than building out and expanding existing control rooms or building completely new control rooms, users can scale up by easily adding more AR devices.

Figure 16:
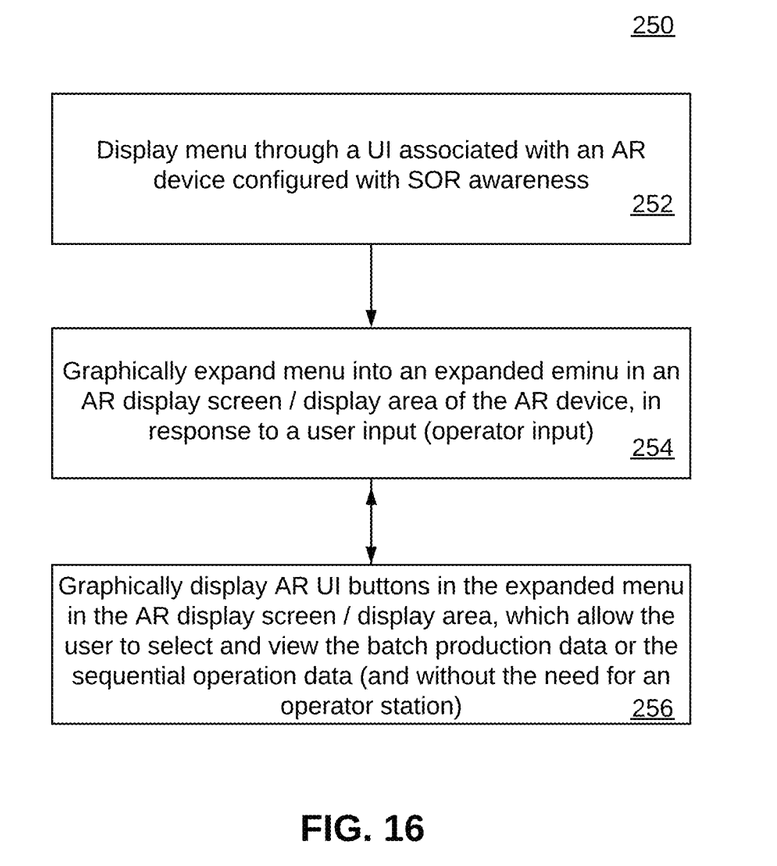
FIG. 16 illustrates a flow chart of operations depicting logical operational steps of a method for the delivery of interactive messaging and instructions through an AR device in a batch production or a sequential operation.

FIG. 16 illustrates a flow chart of operations depicting logical operational steps of a method 250 for the delivery of interactive messaging and instructions through an AR device in a batch production or a sequential operation. As shown at block 252, a step or operation can be implemented for displaying a menu through a UI associated with an AR device configured with a scope of responsibility awareness. Such a scope of responsibility awareness can allow the AR device to display a visualization of batch production data associated with a batch production or sequential operation data associated with a sequential operation that is within an assigned scope of responsibility of a user. Next, as shown at block 254, in response to an input by the user, the menu can be graphically expanded in a display screen or display area of the AR device, which graphically displays a visualization of the batch production data or the sequential operation data.

Thereafter, as depicted at block 256, a step or operation can be implemented in which the expanded menu displays graphically displayed buttons in the display screen or the display area, which allows the user to select and view the batch production data or the sequential operation data. In this manner, the visualization of the batch production data or the sequential operation data can be displayed without the need for an operator station.

Note that the batch production data or the sequential operation data can comprise one or more of: batch data, procedural messages, and instructions. In addition, the aforementioned instructions can comprise interactive instructions generated by one or more of: a recipe, a sequence or a recipe step of a process. In addition, these instructions can be propagated with the procedural messages.

The procedural messages can contain textual data presented to the user through the visualization of the batch production data or the sequential operation data. The procedural messages can be generated with respect one or more tagged points that can automatically provide the scope of responsibility awareness, which determines if the textual data should be shown to the user of the AR device. In addition, the visualization can be implemented as a visual overlay that augments a view of industrial equipment. Finally, the visual overlay can display in the display screen or display area of the AR device, the context of operations for executing production including system automated tasks and manual interactions.

It can be appreciated that in conventional systems, operators in the field may need to rely on another operator communicating over audio and relaying relevant data or operator stations may need to be placed in the field, which is not always possible due to safety reasons and physical constraints of the environment. Sometimes, for example, another operator with more experience who knows a procedure well may perform the task alongside an inexperienced operator; however, this practice is still prone to user error.

Some conventional solutions may use mobile applications to display the messages or instructions; however, as opposed to any mobile messaging applications, the disclosed AR solution additionally allows the contextual data to be displayed to the operator while remaining "hands free", thereby providing the operator with step by step guidance while using their hands to perform the necessary tasks.

Other AR solutions for industrial automation focus primarily on maintenance tasks. These solutions can be applied to a batch, but may require a list of tasks be loaded to the device. One feature that can differentiate the disclosed embodiments from these other solutions is that an operator can use the disclosed approach for regular operation of any batch manufacturing facility and without the need for a dedicated operator station. The AR device 100 can, for example, receive system notifications that can provide all data real time including the list of tasks or instructions, which can be automatically generated from the sequences themselves programmatically.

Other solutions must be preloaded or sent to the device for a specific maintenance task, or can be added real time, but are not controlled and validated for regulatory markets. By integrating with notifications generated pro-grammatically from the recipes and sequences, the tasks can be fully automated as well as controlled and validated to ensure compliance. Another aspect of the disclosed embodiments is that leveraging a selected "Reference Batch" containing historical data can show the operator past messages and predict future messages or tasks in addition to showing current tasks.

As can be appreciated by one skilled in the art, embodiments can be implemented in the context of a method, data processing system, or computer program product. Accordingly, embodiments may take the form of an entirely hardware embodiment, an entirely software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of embodiments may also be written in procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a bidirectional data communications network such as a local area network (LAN) or a wide area network (WAN), a wireless local area network (WLAN), wireless data network e.g., Wi-Fi, Wimax, 802.xx, and/or a cellular network or the bidirectional connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block or feature of the illustrations, and combinations of blocks or features, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks or elsewhere herein. To be clear, the disclosed embodiments can be implemented in the context of, for example a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following discussion is intended to provide a brief, general description of suitable computing environments in which the system and method may be implemented. The disclosed embodiments can be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that can perform particular tasks or which can implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be private (e.g., accessible only to that module) and which can include source code that actually implements the routines in the module. The term module can also relate to an application, such as a computer program designed to assist in the performance of a specific task, such as implementing the AR operations discussed herein. Examples of modules include the data acquisition module 106, the visualization module 108, the user input module 110, and the presentation module 112 shown in FIG. 1.

It will be appreciated that variations of the above-disclosed embodiments and examples and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for the delivery of interactive messaging and instructions through an augmented reality device in a batch production, comprising:
    displaying a menu through a user interface associated with an augmented reality device configured with a scope of responsibility awareness that allows the augmented reality device to display a visualization of batch production data associated with a batch production that is within an assigned scope of responsibility of a user, wherein the scope of responsibility awareness includes information revealed to a corresponding user that relates to user data and messages concerning the batch production data running on units as the assigned scope of responsibility of the user; and
    graphically expanding the menu in response to an input by the user, wherein the expanded menu comprises graphically displayed buttons that allow the user to select and view the batch production data and wherein the visualization of the batch production data is displayed without a need for an operator station.

2. The method of claim 1 wherein the batch production data comprises: batch data, procedural messages, and instructions.

3. The method of claim 2 wherein the instructions comprise interactive instructions generated by at least one of: a recipe, a sequence or a recipe step of a process.

4. The method of claim 2 wherein the instructions are propagated with the procedural messages.

5. The method of claim 2 wherein the procedural messages contain textual data presented to the user through the visualization of the batch production data and wherein the procedural messages are generated with respect to at least one tagged point that automatically provides the scope of responsibility awareness to determine if the textual data should be shown to the user of the augmented reality device.

6. The method of claim 1 wherein the visualization comprises a visual overlay that augments a view of industrial equipment.

7. The method of claim 6 wherein the visual overlay displays a context of operations for executing the batch production including system automated tasks and manual interactions.

8. A system for the delivery of interactive messaging and instructions through an augmented reality device in a batch production, comprising:
    an augmented reality device associated with a user interface, wherein a menu is displayed through the user interface associated with the augmented reality device, wherein the augmented reality device is operable with a scope of responsibility awareness that allows the augmented reality device to display a visualization of batch production data associated with a batch production that is within an assigned scope of responsibility of a user, wherein the scope of responsibility awareness includes information revealed to a corresponding user that relates to user data and messages concerning the batch production data running on units as the assigned scope of responsibility of the user; and
    graphically displayed buttons associated with the user interface that allow the user to select and view the batch production data, wherein the menu is graphically expandable in response to an input by the user, and wherein the visualization of the batch production data is displayed without a need for an operator station.

9. The system of claim 8 wherein the batch production data comprises at least one of: batch data, procedural messages, and instructions.

10. The system of claim 9 wherein the instructions comprise interactive instructions generated by at least one of: a recipe, a sequence or a recipe step of a process.

11. The system of claim 9 wherein the instructions are propagated with the procedural messages.

12. The system of claim 9 wherein the procedural messages contain textual data presented to the user through the visualization of the batch production data and wherein the procedural messages are generated with respect to at least one tagged point that automatically provides the scope of responsibility awareness to determine if the textual data should be shown to the user of the augmented reality device.

13. The system of claim 8 wherein the visualization comprises a visual overlay that augments a view of industrial equipment.

14. The system of claim 13 wherein the visual overlay displays a context of operations for executing production including system automated tasks and manual interactions.

15. A system for the delivery of interactive messaging and instructions through an augmented reality device in a batch production, comprising:
    at least one processor; and
    a non-transitory computer-usable medium embodying computer program code, the computer-usable medium capable of communicating with the at least one processor, the computer program code comprising instructions executable by the at least one processor and configured for:

displaying a menu through a user interface associated with an augmented reality device configured with a scope of responsibility awareness that allows the augmented reality device to display a visualization of batch production data associated with a batch production that is within an assigned scope of responsibility of a user, wherein the scope of responsibility awareness includes information revealed to a corresponding user that relates to user data and messages concerning the batch production data running on units as the assigned scope of responsibility of the user; and graphically expanding the menu in response to an input by the user, wherein the expanded menu comprises graphically displayed buttons that allow the user to select and view the batch production data and wherein the visualization of the batch production data is displayed without a need for an operator station.

16. The system of claim 15 wherein the batch production data comprises at least one of: batch data, procedural messages, and instructions.

17. The system of claim 16 wherein the instructions comprise interactive instructions generated by at least one of: a recipe, a sequence or a recipe step of a process.

18. The system of claim 16 wherein the instructions are propagated with the procedural messages.

19. The system of claim 16 wherein the procedural messages contain textual data presented to the user through the visualization of the batch production data and wherein the procedural messages are generated with respect to at least one tagged point that automatically provides the scope of responsibility awareness to determine if the textual data should be shown to the user of the augmented reality device.

20. The system of claim 15 wherein the visualization comprises a visual overlay that augments a view of industrial equipment, and wherein the visual overlay displays a context of operations for executing including system automated tasks and manual interactions.

* * * * *